United States Patent [19]
Landblom et al.

[11] 3,850,087
[45] Nov. 26, 1974

[54] CREPE GRIDDLE FOR MAKING THIN UNIFORM CREPES

[76] Inventors: John A. Landblom, 1019 11th St., Boulder, Colo. 80302; Arthur W. Mecklenburg, 755 Grant Pl., Boulder, Colo. 80448

[22] Filed: Apr. 4, 1973

[21] Appl. No.: 347,716

[52] U.S. Cl. .................. 99/422, 99/425, 99/447, 126/390
[51] Int. Cl. .............................................. A47j 37/10
[58] Field of Search ............ 99/422, 342, 372, 403, 99/423, 424, 425, 427, 447, 450; 126/373, 390; 220/70, 1

[56] References Cited
UNITED STATES PATENTS

| | | | |
|---|---|---|---|
| 104,611 | 6/1870 | Marshall | 126/390 |
| 2,198,647 | 4/1940 | Wolcott | 99/422 X |
| 2,515,617 | 7/1950 | Tilford | 99/422 X |
| 2,554,412 | 5/1951 | Kavanagh | 99/447 X |
| 2,962,985 | 12/1960 | Castronuovo | 99/423 X |
| 3,349,726 | 10/1967 | Fono | 99/423 X |
| 3,747,506 | 7/1973 | Belgard | 99/425 X |
| 3,747,509 | 7/1973 | Hinkle | 99/447 X |

*Primary Examiner*—Robert L. Bleutge
*Assistant Examiner*—Arthur O. Henderson
*Attorney, Agent, or Firm*—H. Kenneth Johnston, II

[57] ABSTRACT

This invention is concerned with a cooking utensil having a continuous convex cooking surface for cooking crepes or other thin pancake like foodstuff.

4 Claims, 3 Drawing Figures

PATENTED NOV 26 1974 3,850,087

CREPE GRIDDLE FOR MAKING THIN UNIFORM CREPES

BACKGROUND OF THE INVENTION

1. Field of the Invention

This invention relates to a novel and improved cooking utensil having a continuous convex cooking surface particularly adapted for the preparation of crepes or other thin pancake like foodstuff.

2. Description of the Prior Art

In the prior art, the crepe devices which are currently available are flat or concave in structure and require the batter to be evenly spread over the surfaces by moving the pan or device in a circular motion and further requiring that the crepe batter be turned over to cook the reverse side producing a product of varying thicknesses. There are various utensils with convex surfaces available, however, such devices are of little use in the preparation of uniformly thin crepes or other thin pancake like foodstuff as the convex surfaces are not continuous or does not extend above the outer lip forming an undesirable reservoir around the outer perimeter of the convex surface.

SUMMARY OF THE INVENTION

The present invention discloses a cooking utensil or device for the use in preparation of crepes or other pancake like foodstuff having a continuous convex cooking surface. This utensil is especially useful in the preparation of thin uniform crepes in a short cooking time.

The foregoing features and advantages of the invention will be apparent from the following more particular description of preferred embodiments of the invention as illustrated in the accompanying drawing.

DESCRIPTION OF THE PREFERRED EMBODIMENT

In the preferred embodiment, the batter cooking device has a handle 4, a heat conductive body with a continuous convex cooking surface 2, and a lip 8 axially surrounding proximate its outer parameter. The underside includes a plurality of fins 6 to maintain the embodiment's stability over various sizes of cooking elements.

Figure 1:
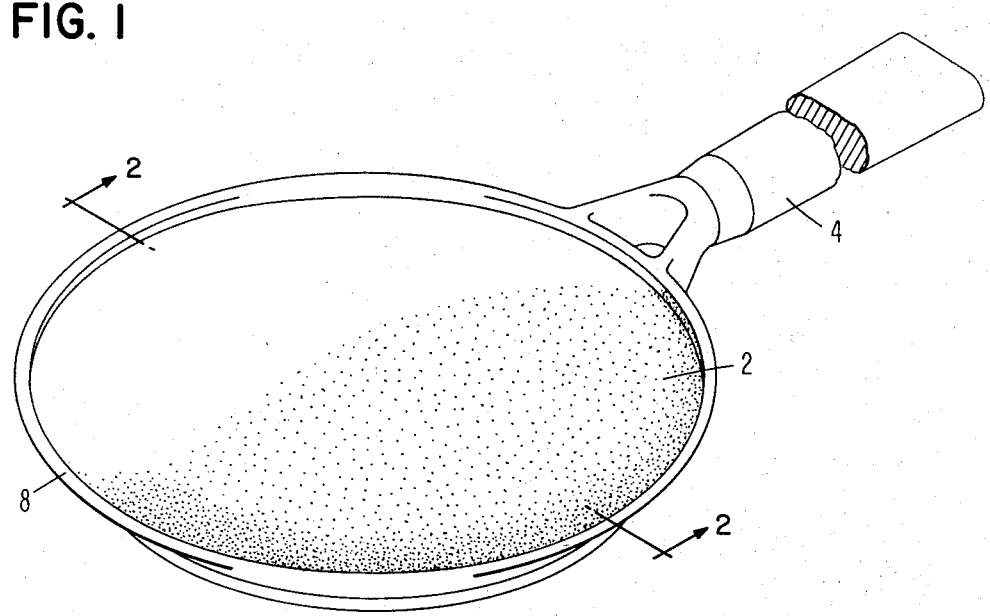
FIG. 1 is a perspective view of the present invention showing the cooking utensil with a handle and the continuous convex cooking surface.
Figure 2:
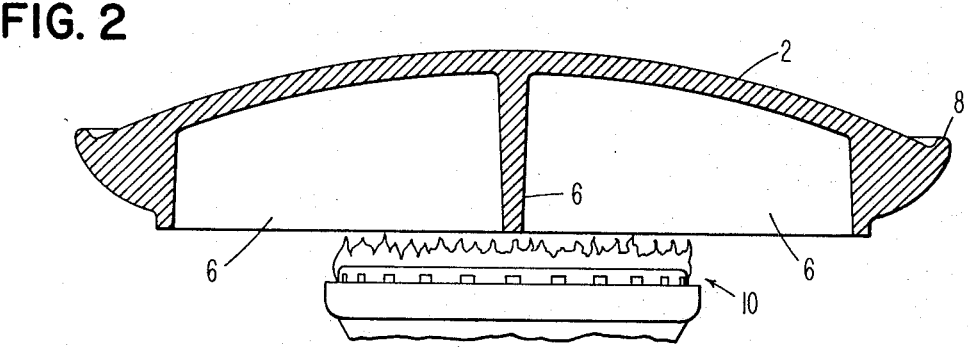
FIG. 2 is a section taken along lines 2—2 of FIG. 1 of the present invention shown in cooking position supported by a heat conductive fin over a heat source.
Figure 3:
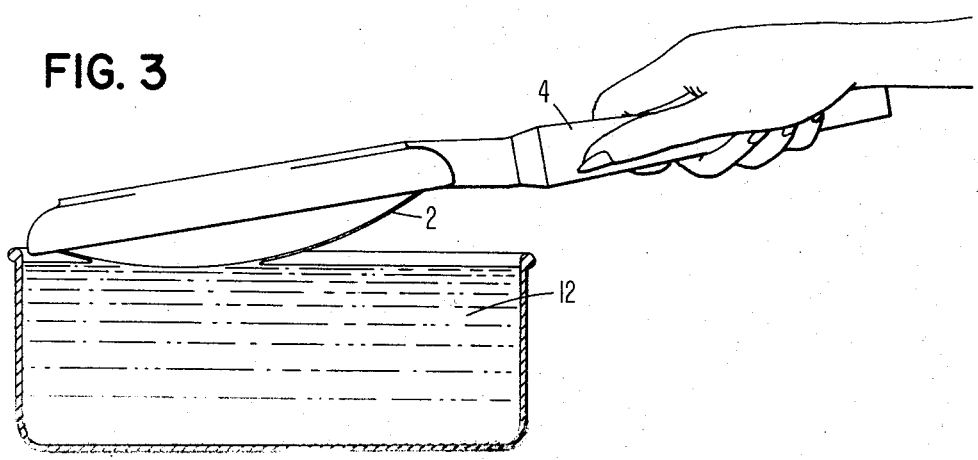
FIG. 3 shows the griddle of the present invention in use applying batter to the convex cooking surface.

In operation, the crepe griddle, having a continuous convex cooking surface 2, is first preheated on a stove or other heat source 10, with a convex surface preferably away from the heat source. Batter 12 is then applied to the continuous convex cooking surface by dipping the crepe griddle into the batter 12 as shown in FIG. 3. "Batter" is defined as any liquid which when heated solidifies to an edible foodstuff. "Liquid" is defined as a material which may have solid pieces within its composition but which will flow in the direction of easiest resistance under ambient conditions. After dipping the continuous convex cooking surface 2 of the cooking utensil, it is returned directly to the heat source 10, convex side up or away from the heat, and simultaneously cooking both sides of the crepe or other thin pancake like foodstuff. Completion of cooking may be accomplished in as little as 20 seconds after returning the crepe griddle to the heat source 10. The crepe or other thin pancake like foodstuff is removed by turning the crepe griddle upside down and gently prodding the finished foodstuff with a fork or other utensil. This process results in a uniformly thin crepe or other pancake like foodstuff which does not require turning to be cooked on the reverse side as the thin uniformity of the batter allows said foodstuff to cook through without turning.

In the preferred embodiment, the heat conductive body is that of aluminum, however, suitable heat conductive materials are well known in the art and are largely a matter of choice.

Although the preferred embodiment does not show a treated cooking surface, it is clear to one skilled in the art that various materials may be applied to continuous convex cooking surface 2 such as various vegetable greases or oils, polymeric materials including silicones, chlorinated and florinated polymers.

In the preferred embodiment, the continuous convex cooking surface 2 is substantially that of a generated conic section. That said generated conic section shall, in the preferred embodiment have a radius of curvature of approimately 9 inches, that of a basketball, but may range from a radius of curvature of 1 inch, that of a baseball, to a 60 inch radius, that of a weather balloon.

Although the present invention shows only a single continuous convex cooking surface 2, it is apparent to one skilled in the art that multiple continuous convex cooking surfaces could be attached to a single utensil.

It is clear to one skilled in the art that the continuous convex cooking surface 2 may be that of a sphere, a generated parabola, a circle or other geometric configuration arcuate in nature.

It is also clear to one skilled in the art that the batter 10 may be applied to the continuous cooking surface 2 by pouring the batter over the continuous convex cooking surface. If the batter is sufficiently fluid, it may be sprayed onto the continuous convex cooking surface 2.

It is understood that although the preferred embodiment shows a lip 8 around the outer perimeter of the utensil, the lip may be greater or lesser and may be eliminated, however, shall not exceed in dimension, a height such that said convex cooking surface 2 shall always protrude above said lip 8.

Although the preferred embodiment shows the fins 6 to extend to the center of the griddle, it would be clear to one skilled in the art to alter the length of the fins 6 to such a dimension as to support the griddle on any size heat source.

While there have been described herein what are at present considered preferred embodiments of the invention, it will be clear to those skilled in the art that many modifications and changes may be made therein without departing from the essence of the invention. It is, therefore, to be understood that the explanatory embodiment is illustrative and not restrictive of the invention, the scope of which is defined in the appended claims, and that all modifications that come within the meaning and range of equivalency of the claim are intended to be included therein.

What is claimed is:

1. A batter cooking device, comprising: a heat conductive body having a continuous convex cooking surface, a lip, said lip continuously surrounding said continuous convex cooking surface, said continuous convex cooking surface extending to said lip extending axially in the same direction as said convex cooking surface wherein said convex cooking surface protrudes above said lip of said batter cooking device and a plurality of heat conductive support fins continuously joined to the surface of said cooking device opposed to said continuous convex cooking surface.

2. A batter cooking device according to claim 1 wherein said plurality of heat conductive fins comprises substantially of three heat conductive fins spaced equidistant from each other.

3. A batter cooking device according to claim 1 wherein said continuous convex cooking surface has a constant radius of curvature ranging in the range from 1 inch to 60 inches.

4. A batter cooking device according to claim 1 wherein said continuous convex cooking surface has a radius of curvature of approximately 9 inches.

* * * * *